UNITED STATES PATENT OFFICE.

RICHARD LAUCH, OF ELBERFELD, GERMANY, ASSIGNOR TO THE FARBENFABRIKEN, VORMALS FR. BAYER & CO., OF SAME PLACE.

DYE-STUFF.

SPECIFICATION forming part of Letters Patent No. 476,393, dated June 7, 1892.

Application filed November 19, 1891. Serial No. 412,431. (Specimens.) Patented in France December 2, 1887, No. 187,365.

*To all whom it may concern:*

Be it known that I, RICHARD LAUCH, chemist, (assignor to the FARBENFABRIKEN, VORMALS FR. BAYER & CO., at Elberfeld,) a subject of the King of Prussia, residing at Elberfeld, in Germany, have invented a valuable Improvement in the Manufacture of Dye-Stuffs, of which I give in the following a clear and exact description, and for which the aforesaid FARBENFABRIKEN has already obtained Letters Patent in France, No. 187,365, dated December 2, 1887.

My invention relates to the production of a new gray coloring-matter that dyes unmordanted cotton in neutral and alkaline baths, and is obtained from the product resulting by the combination of one molecular proportion of tetrazo-diphenyl with one molecular proportion of salicylic acid and one molecular proportion of alpha-naphthylamine and, after sulphonating the same, by further combining one molecular proportion of the tetrazo compound of it with the sodium salt of alpha-naphthol-alpha-monosulphonic acid.

In carrying out my invention practically I proceed as follows: 28.2 kilos, by weight, of benzidine sulphate are finely suspended in water, mixed with 56.4 kilos, by weight, of muriatic acid at 21° Baumé, and diazotized by fourteen kilos of sodium nitrite. The thus-obtained solution of tetrazo-diphenyl is then added to an icy cold solution of fourteen kilos, by weight, of salicylic acid that has been rendered alkaline by addition of sodium carbonate. After standing for some hours the production of the intermediate substance is completed and a hydrochloric-acid solution of 14.3 kilos, by weight, of alpha-naphthylamine is added to the latter mixture. The formation of the dye-stuff begins immediately and after standing for some hours is complete. On addition of alkali the tetrazo compound separates and the precipitate is filtered off, washed, and dried. 47.3 kilos, by weight, of the thus-obtained mixed tetrazo compound of the formula

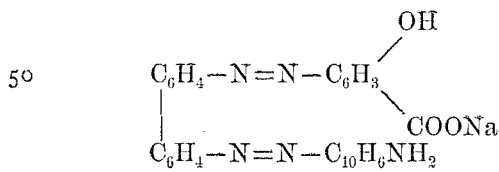

are, in thoroughly-dried state, slowly added to two hundred kilos, by weight, of fuming sulphuric acid containing twenty per cent. of anhydride at a temperature from about 0° to 30° centigrade, and when a portion of the mixture dissolves without any residue in alkali the whole liquid is poured on ice and the separating sulpho-acid of the mixed tetrazo compound is filtered off and redissolved in sodium carbonate. This alkaline solution, cooled with ice, is then mixed with seven kilos, by weight, of sodium nitrite, and thereupon acidulated with hydrochloric acid. After standing for about twelve hours the diazotation is complete, and the produced diazo compound, after having been filtered off, is added to a watery solution of 24.6 kilos, by weight, of the sodium salt of the alpha-naphthol-alpha-monosulphonic acid and carbonate of soda. The mixture is then allowed to stand at low temperature for about twelve hours, and after this time the conversion of the diazo compound into the new dye-stuff is complete. The latter, after having been filtered off and dried, represents a greenish-black amorphous powder that very readily dissolves in water with deep-gray-black color, in soda with red-blue, and in concentrated sulphuric acid with intensely-blue-red color. When its solution in concentrated sulphuric acid is poured into a large quantity of water, a greenish-blue liquid results, a precipitate, however, not being separated. My new dye-stuff dyes unmordanted cotton in a neutral or alkaline bath very fast and intensely greenish black or dark-gray.

From the analogous product not sulphonated it mainly differs by its greater solubility, by its still stronger coloring-power, and its higher fastness.

Having thus described my invention, what I claim, and desire to secure by Letters Patent, is—

1. The coloring-matter herein described, derived from tetrazo-diphenyl and salicylic acid, which is a greenish-black amorphous powder, readily dissolving in water with deep-gray-black color, in soda-lye with red, and in concentrated sulphuric acid with intensely-blue-red color, which latter turns greenish blue on the addition of a large quantity of water, a precipitate, however, not being separated, and which dyes unmordanted cotton in neutral or alkaline baths a greenish black or dark-gray of high fastness and intensity.

2. The process for producing the herein-described dye-stuff by combining molecular proportions of tetrazo-diphenyl, salicylic acid, and alpha-naphthylamine, sulphonating the product thus obtained, diazotizing and further combining it with one molecular proportion of the sodium salt of alpha-naphthol-alpha-monosulphonic acid.

In testimony whereof I have signed my name in the presence of two subscribing witnesses.

RICHARD LAUCH.

Witnesses:
WM. ESSENWEIN,
RUDOLPH FRICKE.